July 12, 1949.  M. G. CROSBY  2,475,779
WAVE LENGTH MODULATOR AND CONTROL MEANS
Original Filed May 14, 1941  3 Sheets-Sheet 1

INVENTOR
MURRAY G. CROSBY.
BY H.S.Grover
ATTORNEY

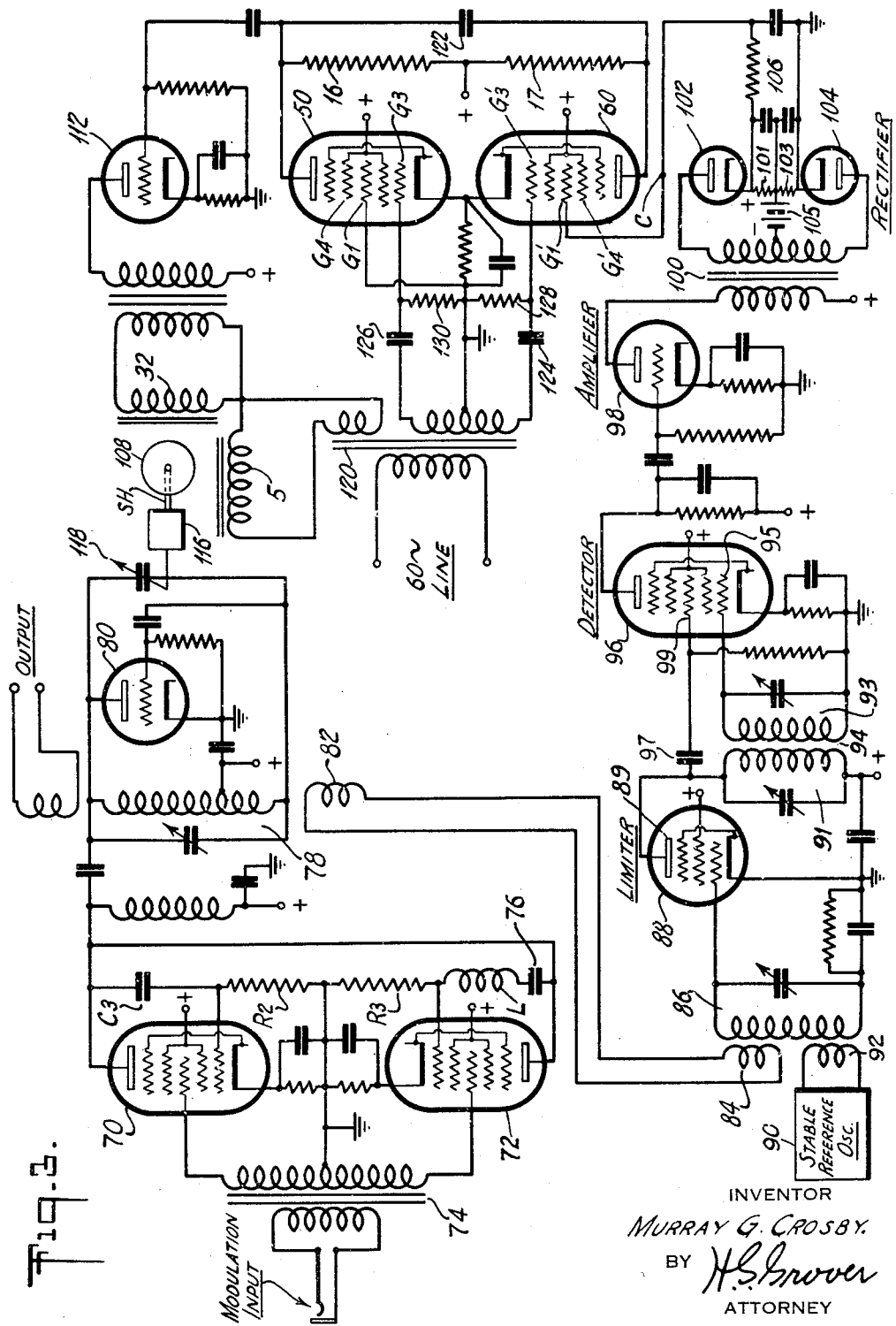

July 12, 1949.   M. G. CROSBY   2,475,779
WAVE LENGTH MODULATOR AND CONTROL MEANS
Original Filed May 14, 1941 — 3 Sheets-Sheet 3
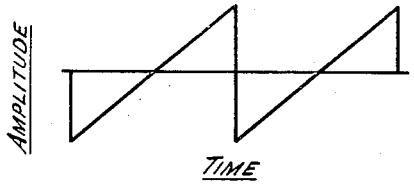
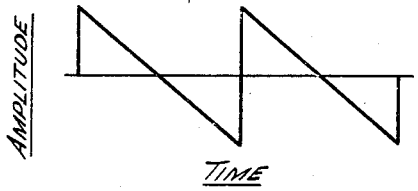
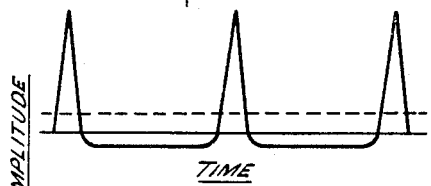
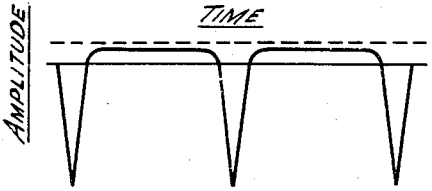
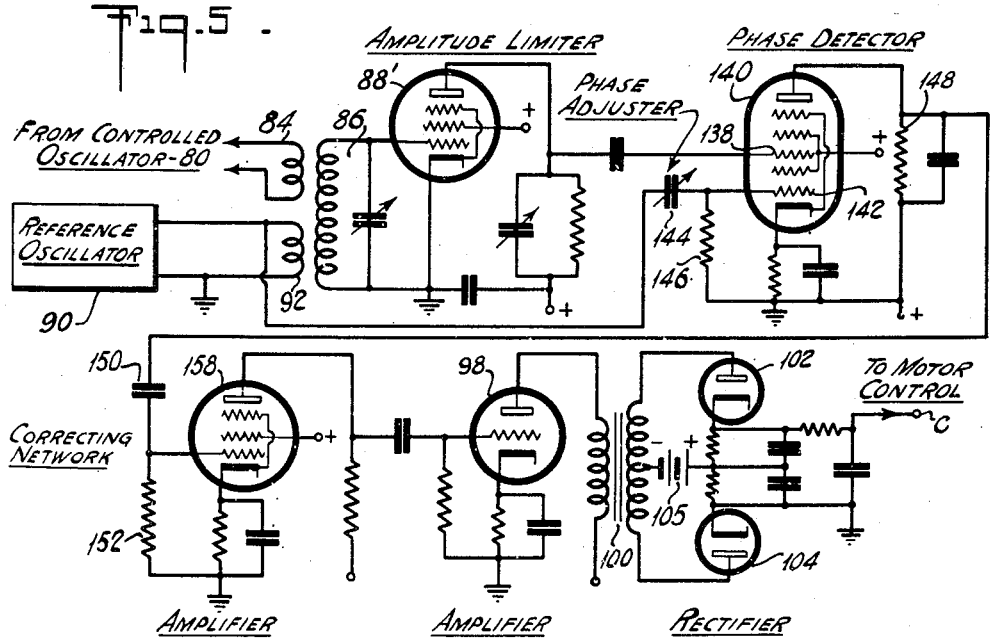
INVENTOR
MURRAY G. CROSBY.
BY
ATTORNEY Patented July 12, 1949

2,475,779

UNITED STATES PATENT OFFICE 2,475,779

WAVE LENGTH MODULATOR AND CONTROL MEANS

Murray G. Crosby, Riverhead, N. Y., assignor to Radio Corporation of America, a corporation of Delaware Original applications May 14, 1941, Serial No. 393,339, and November 18, 1942, Serial No. 465,957. Divided and this application October 20, 1943, Serial No. 506,965

3 Claims. (Cl. 332—19)

This application concerns a new and improved tuning control means and use of the same in a novel wave length modulation system wherein the mean frequency of the wave generated, the wave length of which is being modulated, is stabilized by said control means. This application is a division of my United States application Serial No. 393,339, filed May 14, 1941, now Patent No. 2,380,947, dated July 24, 1945, and of application Serial No. 465,957, filed November 18, 1942, now Patent No. 2,440,600, dated April 27, 1948.

More specifically, this application concerns a type of control circuit suitable for control of the direction of rotation of a two-phase motor for usages such as that of automatic frequency control and remote tuning. The circuit has the advantages of extreme simplicity, together with all-electronic control and high control sensitivity.

In one modification, phase inversion of alternating current is obtained by a pair of tubes each having a grid excited by the said automatic control, with a control potential on another grid and the anodes connected in parallel, so that the output depends on the polarity of the control potential. One modification is a simplified version which obtains its simplicity by means of the application of a novel effect taking place in a pentode when the screen resistor is unbypassed. I have found that when the proper value of unbypassed resistor is used in a two-grid tube of the 6SA7 type, the phase of the voltage amplified by the first grid is reversed. At the same time, the phase relation of the third grid is unaffected, so that if voltages of the same phase are fed to the two grids, they will oppose in the output, or plate, circuit. This makes possible the use of a single tube to obtain a balancing action where two were used before. The phase inversion systems have been claimed in the parent Patent #2,380,947, dated July 24, 1945. The phase inversion system and motor the direction of rotation of which is controlled have been claimed in the first divisional application Serial #465,957, filed November 18, 1942.

The present application concerns frequency control systems for wave generators and wave length modulators of the type in which the mean frequency of a reactance-tube modulated oscillator is stabilized by means of automatic frequency control. In my improved system as described herein, the automatic frequency control described briefly above utilizes a phase inversion circuit, the motor controlled thereby and my novel type of motor-driven condenser and frequency-discriminating circuits, which do not depend upon tuning. Thus, the frequency-controlled oscillator is held to the same frequency as the master reference oscillator, instead of to a constant beat frequency difference. This makes the modulator frequency independent of any tuning except that of the reference oscillator.

Frequency modulators of the prior art, of the type to be described here, are described in my United States applications Serial No. 135,578, filed April 13, 1937, Patent No. 2,279,659, dated April 14, 1942, Serial No. 312,446, filed January 5, 1940, Patent No. 2,279,660, dated April 14, 1942, and Serial No. 355,592, filed September 6, 1940, Patent No. 2,312,079, dated February 23, 1943. In these prior modulators the reference oscillator was combined with the modulated oscillator to form a beat frequency which was applied to a frequency detector to obtain automatic frequency control potentials, or the modulated oscillator was applied directly to a crystal discriminator for detection of the automatic frequency control potentials. Furthermore, the prior circuits utilized the modulating reactance-tube as the device to apply the frequency correction for drift as well as for modulation; in the circuits to be described here, a motor-driven condenser is employed.

In the modulator of the present disclosure, a frequency discriminator is utilized in which the reference oscillator is combined with the modulated oscillator and the phase modulated component of the beat frequency is detected. This detected output has a wave form which has sharp positive peaks when the modulated oscillator is on one side of the reference oscillator, and sharp negative peaks when the modulated oscillator is on the other side of the reference oscillator. Hence, by feeding this detected output to a detecting system which detects the opposite half cycles differentially, a potential is obtained which is positive when the modulator frequency is on one side of the reference frequency and is negative when the modulator frequency is on the other side of the reference frequency. This potential is applied as the automatic frequency control potential to the control grid or grids of a tube or tubes in a phase reversing circuit which controls the direction of rotation of a condenser across the tuned circuit of the modulator. Hence, a frequency deviation either side of the reference frequency causes the motor to turn the tuning condenser in the proper direction and apply a correction.

In describing my invention in detail reference will be made to the attached drawings, wherein Figure 1 illustrates a novel alternating current phase reverser and the same associated with a motor the direction of rotation of which is controlled in a novel manner in accordance with my invention.

Figure 3 illustrates my novel alternating current phase reverser and motor in a wave length modulation system.

Figures 4A to 4D are curves used in describing the operation of my system, while Figure 5 is a modification of the circuit arrangement of Figure 3.

Figure 1:
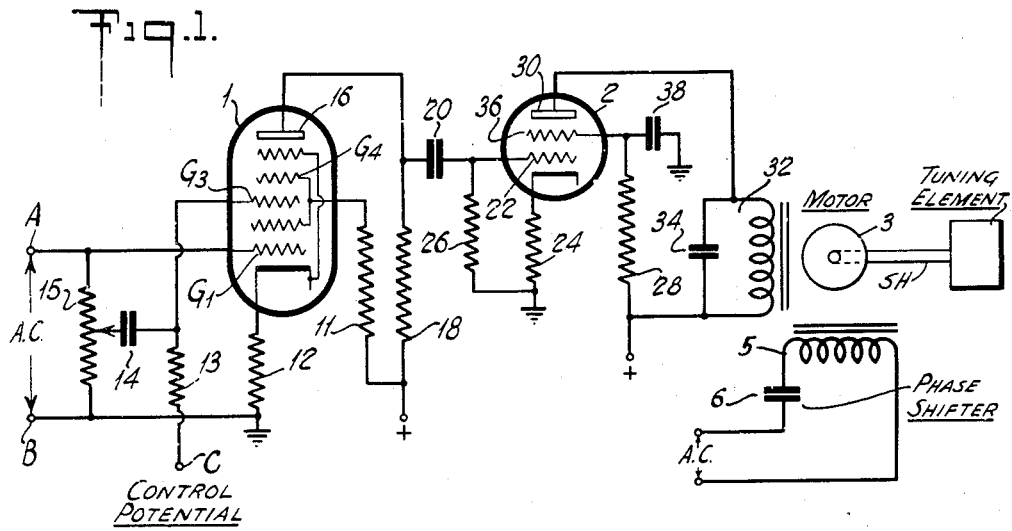

Figure 1 shows an embodiment making use of the principle of the balancing action, obtainable in a two-grid tube, in a control circuit. In this circuit, tubes 1 and 2 serve as amplifiers to amplify the voltage fed to one winding of motor 3 while the other winding is continuously connected to the alternating line voltage through phase-shifting condenser 6. The purpose of condenser 6 is to produce a phase quadrature relation between the currents in the motor windings 5 and 32.

Alternating current voltage of a frequency the same as that applied to winding 5 and of a phase such that the alternating current in winding 32 is substantially in quadrature with that in winding 5 is applied to terminals A and B to produce a potential across potentiometer resistance 15, which is applied to grid G1 and also by way of condenser 14 and resistance 13 to grid G3. A control voltage is fed to terminal C and thence to grid G3. The cathode is connected to ground by a cathode bias resistance 12. The screen grid G4 is charged positive with respect to the cathode by unbypassed resistor 11 and, as pointed out hereinbefore, when the proper value of unbypassed resistor is used in the screen grid direct current circuit of a two-grid tube of the proper type, the phase of the voltage amplified by the first grid is reversed. At the same time, the phase relation of the third grid is unaffected, so that if voltages of the same phase are fed to the two grids, they will oppose in the output or plate circuit. By relatively controlling the amplification of the voltages fed to the anode by the two grids, one or the other thereof can be made large, so that it is no longer balanced out in the output circuit. In this manner phase reversal or inversion of an alternating current is obtained. Tube 1 amplifies the alternating current, while reversing its phase, and the current is supplied by anode 16 and resistance 18 and coupling condenser 20 to the grid 22 of tube 2. The control grid 22 of tube 2 is biased negative by cathode resistance 24 and grid resistance 26. The anode 30 is connected to the winding 32 of motor 3. This winding is shunted by a condenser 34 which tunes the winding 32 to resonances. The screen grid 36 is charged positive by a direct current circuit through resistance 28 which is bypassed by condenser 38.

In the absence of control voltage at the control terminal C, potentiometer 15 is adjusted so that the voltage amplified by G1 exactly balances out the voltage amplified by G3 in resistor 18. Under this condition, there will be no voltage fed through amplifier 2 to winding 32 of the motor so that the shaft SH will not rotate. If a positive voltage is applied to the control terminal C, the balanced condition in tube 1 is upset and a voltage having a phase corresponding to that amplified by G3 is repeated in tube 2 and supplied to the motor winding 32. This causes the motor to rotate in a direction depending upon the relative polarities of windings 32 and 5. If a negative voltage is fed to the control terminal C, the voltage amplified by G1 predominates in the output of tube 1. This voltage has a phase opposite to that amplified by G3, so that the direction of rotation of the motor is reversed. Thus it can be seen that the direction of rotation, and stopping, of the motor is under control of the potentials applied to the control terminal C.

Various tube combinations and circuit element values may be used in my system, and I do not propose hereby to limit the same to the partcular tubes and circuit element constants listed herein. However, the following are a typical set of experimentally determined circuit constants used in the circuit of Figure 1: Tube 1 is a 6SA7, tube 2 a 6AG7 and the motor a Bodine dynamic braking Type KCI. The voltage applied to G1 is about 0.6 volt with about one-half that value fed to G3. The motor starts with plus or minus 0.17 volt applied to the control terminal C. Resistor 12=1500 ohms. Resistor 11=150,000 ohms. Resistor 26=0.5 megohm. Resistor 24=80 ohms. Resistor 28=20,000 ohms. Condenser 20=0.1 microfarad. Condenser 38=1.0 microfarad. Condenser 34=1.0 microfarad. Total plate current drain from the 250 volt supply is about 35 milliamperes. The alternating current applied at A and B may be tube filament voltage or the same reduced to about one volt. This alternating current may be supplied from the same source supplying winding 5 as in Fig. 3.

The control potential applied at C may be of any nature. For example, the said control potential may represent the deviation in frequency of a radio wave being amplified and the motor 3 may tune the said amplifier to the wave amplified, or the control potential may represent the deviations in mean frequency of a wave length modulated oscillator, in which case the motor drives a tuning element in the said oscillator circuit to stabilize said mean frequency of operation. The system obviously may be put to numerous other uses in the radio and associated arts.

Figure 2:
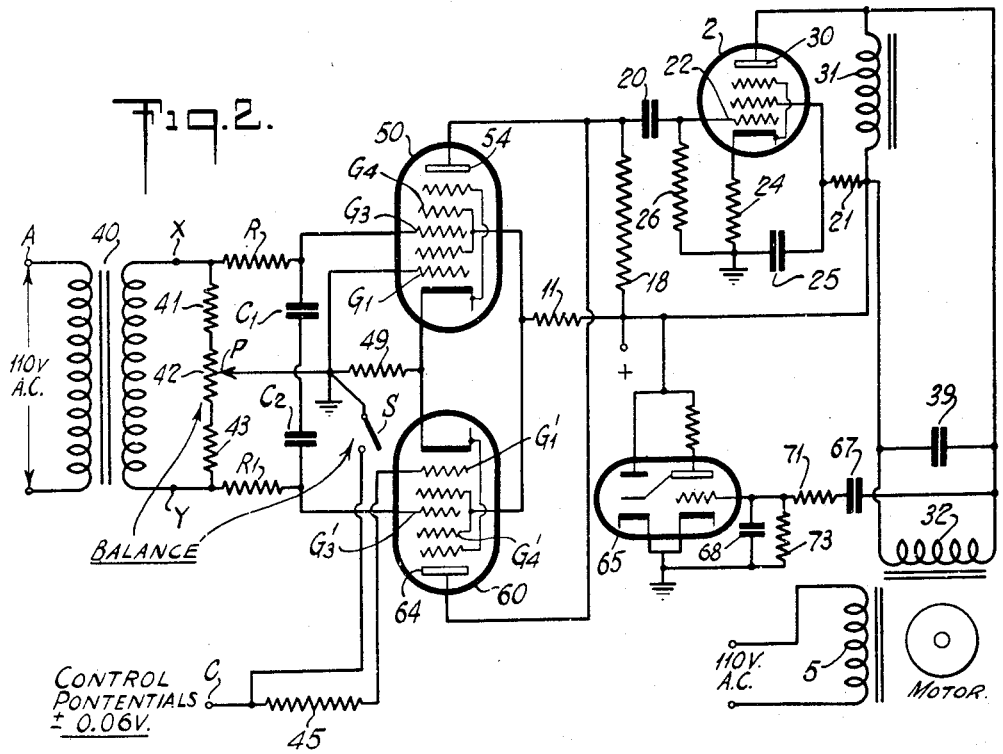
Figure 2 illustrates a modification of the arrangement of Figure 1.

In the modification of Figure 2, double-grid converter tubes 50 and 60 are used for the phase reverser. The alternating current voltage is fed by transformer 40 to the second grids G3 and G3' and the control potentials are fed to the first grids G1 and G1'. In the circuit shown, the controlling grid G1 is grounded and the grid G1' receives the control potentials, but if desired, pushpull controlling potentials may be applied to both grids. Resistors R and R1 and condensers C1 and C2 form the phase shifters to shift the phase 90 degrees, so that a phase quadrature relation between the currents in windings 5 and 32 is produced. The anodes 54 and 64 of tubes 50 and 60 are tied together and connected to output resistance 18. The alternating current is amplified by a tube 2 as in Figure 1 and fed to winding 32.

Potentiometer 42 is used to balance the amplitudes of the alternating current inputs to the grids G3 and G3' of the two tubes. This balance is obtained by closing switch S and adjusting for minimum deflection on the electron-ray indicator tube 65. This indicator tube is placed across the terminals of the motor winding 32 which receives the controlled voltage, so that its minimum deflection will indicate balance of the two tube inputs, and full deflection will indicate full voltage applied to the motor terminals. The cathode and screen resistors 49 and 11 of the two reverser tubes 50 and 60 are common and unbypassed.

The motor winding 32 is connected directly across the output choke 31 connected to the anode 30 of the power amplifier 2, without the use of a blocking condenser to eliminate direct current flow through the motor windings. The small amount of direct current that flows through the motor winding 32 with this connection does not appreciably change the operation of the motor.

This control circuit is very sensitive to control potentials. A control voltage of plus or minus 60 millivolts is sufficient to run the motor in either direction. If desired, this sensitivity may be increased by placing an amplifier between the output of the reverser tubes and the input of the power amplifier.

The principle of operation is to feed one winding of the two-phase motor continuously with the line voltage and reverse the phase of the voltage fed to the other winding. The two type 6SA7 tubes 50 and 60 form a phase reverser by being fed in pushpull and having their outputs in parallel. For the balanced condition, in the absence of control potential these tubes give no output. Plus or minus voltage on one of the control grids unbalances the relative gains, so that the phase of the output voltage depends upon polarity of the control potentials. For the circuit shown, a control voltage of plus or minus 0.06 volt will start the motor in either direction.

The R, C circuits in the grid circuits of the two type 6SA7 tubes 50 and 60 are phase shifters to give the necessary 90 degree phase shift between the voltages fed to the two windings. Switch S shorts out the control potentials so that potentiometer point P may be adjusted to balance the inputs to the two 6SA7's. The type 6U6 tube 65 is used to indicate when the motor is running.

The circuit of Figure 2 operated well when used in an automatic frequency control system in a receiver, with the discriminating circuit supplying the control potentials at C and with the the motor controlling the tuning of the receiver circuit. The circuit elements were of the following values, using tubes types 6SA7 at 50 and 60, tube type 6AG7 at 2 and a tuning tube type 6U5 at 65, with 6.3 volts alternating current applied at points X and Y. This voltage may be derived from the filament winding on an A.-C. transformer. Resistances 41, 42 and 43 are each 1000 ohms. Resistances R and R1 are each .25 megohm. Resistance 45, .1 megohm. Resistance 49, 800 ohms. Resistance 11, .2 megohm. Resistances 18 and 26, .5 megohm. Resistance 24, 40 ohms. Resistance 21, 20,000 ohms. Resistances 71 and 73, each one megohm. Condensers C1 and C2, .1 microfarad. Condensers 20, 67 and 68, .01 microfarad. Condenser 39 is 1 or 2 microfarads. This condenser is preferably such as to tune the plate motor winding 32 to resonance with respect to the applied alternating current. .06 volt is applied at C to the grid G1'.

As stated above, my novel control means is suitable for many uses and is particularly suitable for use in the automatic frequency control circuits of a wave length modulator. When so used, a discriminator circuit excited by voltages of a frequency which varies with variations in the mean frequency of the generated wave length modulated waves supplies the control potential applied at C. Thus, the motor controls the mean tuning of the oscillator, instead of the same being controlled by the reactance tube as in my United States application Serial No. 135,578, filed April 13, 1937, Patent #2,279,659, dated April 14, 1942. This system controls the mean frequency of the generator quite accurately and has an added advantage in that the frequency control means rests in its last position when the automatic control system fails. Since it is independent of the reactance tube modulator of the system, a smaller degree of reactance tube control may be used and stability lies more in the oscillator circuits and not so much in the reactance tube circuits.

Figure 3 shows a specific embodiment of my novel phase reverser and control motor in a novel wave length modulation system, in which a frequency modulation detector is used in the discriminator circuit for obtaining the automatic frequency control potentials. Tubes 70 and 72 are reactance-tube modulators which pushpull modulate oscillator 80. Tube 70 provides a capacitive effect with feed-back phase shifter C3, R2. Tube 72 provides an inductive effect with phase shifter L, R3. The reactances of C3 and L are normally made large compared to the resistance of R2 and R3. 76 is a blocking condenser. The oscillator 80 is of the regenerative type and has a tank circuit 78 which includes as a part of its reactance the reactive effects produced in a well known manner in reactance tubes 70 and 72. These reactance tubes have their conductances modulated in pushpull by potentials from 74 so that their reactive effects, one inductive, the other capacitive, increase and decrease in phase opposition. The effective capacity and inductance increase and decrease in phase, and since they are part of the oscillator circuit the wave length of the oscillations generated is modulated. Similar generating and modulating means have been disclosed in my United States application Serial #209,919, filed May 25, 1938, Patent #2,250,095, dated July 22, 1941, and in my United States application Serial #312,446, filed January 5, 1940, Patent #2,279,660, dated April 14, 1942.

Part of the output of oscillator 80 is link-coupled by windings 82 and 84 to the input circuit 86 of limiter tube 88. The output of the reference oscillator 90 is also fed by winding 92 to the input of the limiter 88. The relative amplitudes of these two voltages fed to the limiter are adjusted to be very nearly equal, so that the wave form of the frequency modulation component of the resultant is sharply peaked, as shown in Figure 4C. With a given ratio of these two voltages, the wave form of Figure 4C will be obtained when the modulated oscillator is on one side of the reference oscillator frequency, and the form of Figure 4D when it is on the other side. This phenomenon is more completely described in my paper, "Frequency modulation noise characteristics," published in the April, 1937 issue of the Proceedings of the Institute of Radio Engineers. Figure 4 of that paper shows the wave forms which have been calculated from the combination of a carrier and a single sinusoidal interference frequency. If the ratio of the relative amplitudes of the two voltages fed to the limiter is reversed, the relative wave forms of Figures 4C and 4D are also transposed. This latter feature provides one method of reversing the direction of the automatic frequency control potentials which this type of detection supplies.

The output of limiter 88 is fed to transformer 94 which is connected to multi-grid detector 96 in a manner to detect the frequency-modulation component of the limiter resultant. The voltage from the anode 89 of tube 88 is fed by way of reactive circuits 91 and 93, having a retarding effect, to grid 95 and also directly by blocking condenser 97 to grid 99. This type of detector is more completely described in my United States application Serial No. 328,353, filed April 6, 1940, Patent #2,296,090, dated September 15, 1942. The detected output of this detector has the wave form of Figures 4C or 4D depending, upon which side of the reference oscillator frequency the modulated oscillator frequency is located. Voltage amplifier 98 amplifies this output and passes it through pushpull transformer 100 to differential diodes 102 and 104. One of these diodes rectifies the positive half cycles of the wave and the other negative half cycles. Thus, if the wave were as shown in Figure 4C, it is apparent that the detector receiving the positive half cycle corresponding to the sharp peaks would receive the largest voltage and a differential output would appear across the diode resistors 101 and 103.

Battery 105 applies a small negative bias to the diode plates so that only the voltage above the dotted lines in Figures 4C and 4D will be detected. Under this condition, the flattened part of the cycle will not draw any diode current at all, but the sharp peaks will exceed the bias and draw current. This bias thus increases the amount of differential voltage available. I have found experimentally that this bias is not a necessity to the operation of the rectifiers, since practically the same operation was obtained with it as without it. However, this bias may be used to produce an idle range of the control potentials so that the off-frequency deviation will have to exceed a certain amount before the control starts to operate. Such an adjustment is sometimes desirable to prevent excessive activity of the control motor for small frequency variations which do not need correction.

The output of the differential rectifiers is passed through time-constant circuit 106 (which removes the potentials due to fast frequency variations) to a motor control circuit as described above. This circuit consists of motor 108, power transformer 120 and tubes 50, 60 and 112. The shaft SH of the motor is coupled through gear-box 116 to condenser 118, which forms part of the tuned circuits of the modulated oscillator 80. The motor is of the two-phase type with windings 5 and 32. One of these windings, say 5, is continuously fed 60 cycle voltage from transformer 120 and the other winding is fed a voltage which has a phase displaced by either 90 or 270 degrees with respect to the phase of the voltage fed to said one winding. This variable phase voltage is obtained from tube 112 which is fed by the phase-switching circuit consisting of tubes 50 and 60. These two tubes have their plates tied together by means of condenser 122 and are fed in pushpull by a mid-tapped winding on power transformer 120. Condensers 124 and 126 form 90 degree phase shifters in conjunction with resistors 128 anad 130. Thus by biasing one of the tubes towards cutoff and the other towards its operating point, the phase of the voltage in the common output circuit may be reversed so that the direction of rotation of the motor is reversed. The tubes are of the multi-grid type with one of them having its modulator grid G1 grounded and the other having its grid G1' fed by the automatic frequency control potentials. Thus as the control potential becomes, for instance, negative, the amplification of tube 60 is lowered. This causes the output of tube 50 to predominate so that the voltage fed to tube 112 has the phase of the tube 50 output. A positive bias from the automatic frequency control potential causes the amplification of tube 60 to be raised so that the output of tube 60 predominates and tube 112 receives voltage of a phase corresponding to that fed to tube 60 alone.

I have found that this type of motor control is very effective for frequency control, due to the fact that in the absence of control potentials there is a braking effect applied to the motor by the one winding 5 which has voltage applied to it continuously. This braking effect tends to prevent over-shooting of the motor and allows a higher degree of control without motorboating. The fact that only the power for one winding has to be controlled also aids in simplifying the control equipment.

Figure 5 shows the controlling portion of a circuit of the type of Figure 3 in which the detection of the frequency modulation component of the resultant of the two waves is effected by a phase modulation receiver with an audio correction network in its output. Oscillations from the reference oscillator 90 and from the controlled oscillator 80 are as in Figure 3 both fed to the input of the limiter tube 88'. The output of the limiter 88' feeds one grid 138 of multi-grid phase detector 140. The other grid 142 of the detector is fed by oscillations from the unmodulated reference oscillator. Phase adjustment of the oscillations from the reference oscillator is accomplished by means of variable condenser 144 and resistor 146. The limiter 88' thus feeds a resultant modulated in phase to the detector 140, and the reference oscillator 90 feeds to the detector 140 a voltage which may be considered as the synchronized carrier of the phase modulated resultant. The phase shifter 144 and 146 is adjusted for a 90 degree relation between the carrier of the resultant and that furnished by the reference oscillator 90. The phase modulations of the resultant are thus detected and appear on the output resistor 148 of tube 140. The manner in which this detection takes place is well known, having been described in my United States Patent No. 2,063,588, dated December 8, 1936. This output has a wave form as shown in Figure 4A when the controlled wave is on one side of zero beat with the reference oscillator, and like Figure 4B when it is on the other side of zero beat. Calculations of this wave form are shown in my paper "Communication by phase modulation," published in the February, 1939 issue of the Proceedings of the Institute of Radio Engineers. Figure 14 of that paper shows wave forms for two ratios of amplitude of the two waves. It can be seen that as the ratio of amplitudes approaches equality, the wave form approaches the saw-tooth shape shown in Figure 4A and Figure 4B. When this wave form is passed through the correction network composed of condenser 150 and resistance 152, the correction network passes those parts of the wave having the greatest rate of change, with the greatest amplitude. Thus the waves of Figure 4A and Figure 4B are converted to waves like Figures 4C and 4D, respectively. The rest of the control circuit is the same as that of Figure 3. Tube 158 is a voltage amplifier which may make up for the loss incurred by the use of the correction network. Tube 158 has its anode connected to tube 98, which corresponds to tube 98 of Figure 3.

Either of these control systems may be used for automatic frequency control in a receiver, as well as in a modulator as shown. For instance, if the system of Figure 3 were used, the motor-driven condenser might tune the high-frequency oscillator of a superheterodyne receiver and the incoming heterodyned signal would be fed to the limiter on the leads which come from oscillator 80. The control system would then operate to maintain the heterodyned signal at the same frequency as the local reference oscillator.

In my experiments with this type of control system, I have found that the application of frequency modulation to the oscillator does not interfere with the operation of the control. With modulation present, the carrier is modulated across the zero-beat point so that the wave form is modulated between the condition of Figures 4C and 4D. Thus, if the modulating wave is a sinusoidal wave, the wave form will be like Fig. 4C half the time and like Fig. 4D the other half when the modulator is properly tuned. This condition produces a balance in the detected output of the differential diodes, so that no control voltage is obtained. When an off-tune condition is present, the wave form is predominately of one type so that the detected voltage supplies a potential of the right direction for automatic frequency control. Thus, the detection of the wave form which is predominant most of the time allows the operation during the presence of modulation.

I claim:

1. In a wave length modulation system, an oscillation generator having a plurality of variable frequency determining reactances, one of which is a tube reactance, means for modulating said tube reactance in accordance with modulating potentials to thereby modulate the wave length of the oscillations generated, a motor connected with another of said variable reactances, said motor having a pair of field windings, a source of alternating current connected with one of said field windings, an electron discharge tube alternating current phase reverser having input electrodes coupled to said source of alternating current and having output electrodes coupled to the other of said field windings, and means for controlling said tube phase reverser in accordance with a potential which changes in magnitude with deviations in mean frequency of said oscillation generator with respect to a selected frequency.

2. In a wave length modulation system, an oscillation generator, a tuning element therefor a source of modulating potentials, a reactance tube coupled to said generator and controlled by modulating potentials from said source, means for stabilizing the mean frequency of said oscillation generator comprising a motor connected with said tuning element, said motor having a pair of field windings, a source of alternating current connected with one of said field windings, alternating current phase reversing means including an electron discharge device having input electrodes coupled to said source of alternating current and having output electrodes coupled to the other of said field windings, a frequency discriminator circuit coupled to said generator, a rectifier coupled to said discriminator circuit to derive a potential the magnitude of which varies about a base value in the presence of slow variations in the mean frequency of operation of said oscillation generator with respect to a base frequency, and means coupling said rectifier to said discharge device to control the same by said derived potential.

3. In a wave length modulation system, an oscillation generator, a source of modulating potentials, a reactance tube coupled to said generator and to said source of modulating potentials and controlled by modulating potentials from said source to modulate the wave length of the oscillations generated in accordance with the modulating potentials, a tuning element for said generator, a motor connected with said tuning element, said motor having a pair of field windings, a source of alternating current connected with one of said field windings, a voltage phase reverser comprising a pair of electron discharge devices having output electrodes coupled with the other of said field windings and having control electrodes, means for impressing alternating current from said source on two of said control electrodes, a current amplitude limiter having an input coupled to said generator, a source of oscillations of substantially constant frequency coupled to the input of said limiter, said limiter having an output, a wave length modulation detector coupled to the output of said current amplitude limiter, said detector having output electrodes, and means coupling the output electrodes of said detector to a control electrode of said pair of electron discharge devices.

MURRAY G. CROSBY.

REFERENCES CITED

The following references are of record in the file of this patent:

UNITED STATES PATENTS

| Number | Name | Date |
|---|---|---|
| 2,041,855 | Ohl | May 26, 1936 |
| 2,049,712 | Macalpine | Aug. 4, 1936 |
| 2,114,036 | Smith | Apr. 12, 1938 |
| 2,190,319 | Koch | Feb. 13, 1940 |
| 2,250,104 | Morrison | July 22, 1941 |
| 2,296,962 | Tunick | Sept. 29, 1942 |
| 2,332,540 | Travis | Oct. 26, 1943 |
| 2,377,326 | Crosby | June 5, 1945 |
| 2,379,689 | Crosby | July 3, 1945 |
| 2,380,947 | Crosby | Aug. 7, 1945 |